July 15, 1941.  W. B. DEAN  2,249,703

ROOF AND SIDE WALL CONNECTION FOR RAILWAY OR OTHER VEHICLES

Filed March 17, 1939

INVENTOR:
Walter B. Dean.
BY
ATTORNEY

Patented July 15, 1941

2,249,703

UNITED STATES PATENT OFFICE 2,249,703

ROOF AND SIDE WALL CONNECTION FOR RAILWAY OR OTHER VEHICLES

Walter B. Dean, Paris, France, assignor to Edward G. Budd Manufacturing Co., Philadelphia, Pa., a corporation of Pennsylvania Application March 17, 1939, Serial No. 262,407
In France April 25, 1938

1 Claim. (Cl. 105—397)

The present invention relates to a method of connecting the sides and roof of railway (or any other) vehicles at the point at which the panels are provided which separate the window or other openings from each other.

This method of connection, particularly applicable to vehicles constructed of thin, light materials, is designed to unite a roof assemblage with the assemblages constituting the sides, so that said elements, after being united, form an assemblage capable of resisting shearing, bending and all other stresses manifested at the location of the joint.

According to the essential feature of the invention use is made, in the connecting zone between the roof and each of the sides and at the point at which each of the panels which separate the window (or other) openings is mounted, of an outer reinforcing stay plate of sufficiently large dimensions, connected, by welding, to the upper edge of the corrugated sheet metal of the panelling, to the outer flanges of the body uprights (of Z-shape for example), to the member longitudinally connecting the upper ends of these uprights, to the member longitudinally connecting the lower ends of the roof arches, to the outer flanges of these roof arches, to the corrugated sheet metal roof partially covering (overlapping) said stay plate and finally, if necessary, to an outer longitudinal molding, said stay plate having at its lower part a form such that it can serve simultaneously as an element of the panelling and one delimiting the angles of the window openings. These stay plates, which may also be considered as arch (or pier) limits, may or may not extend over the entire length of the vehicle.

According to another characteristic feature of the invention the action of these different outer stay plates is reinforced either by that of an inner stay plate extending over the entire length of the vehicle and the lower edge of which terminates at the level of the upper edge of the window openings, or by that of inner stay plates of the same dimensions as the outer stay plates.

A method of realizing the invention is illustrated diagrammatically on the accompanying drawing by way of example only, the invention not being limited thereto.

Figure 2:
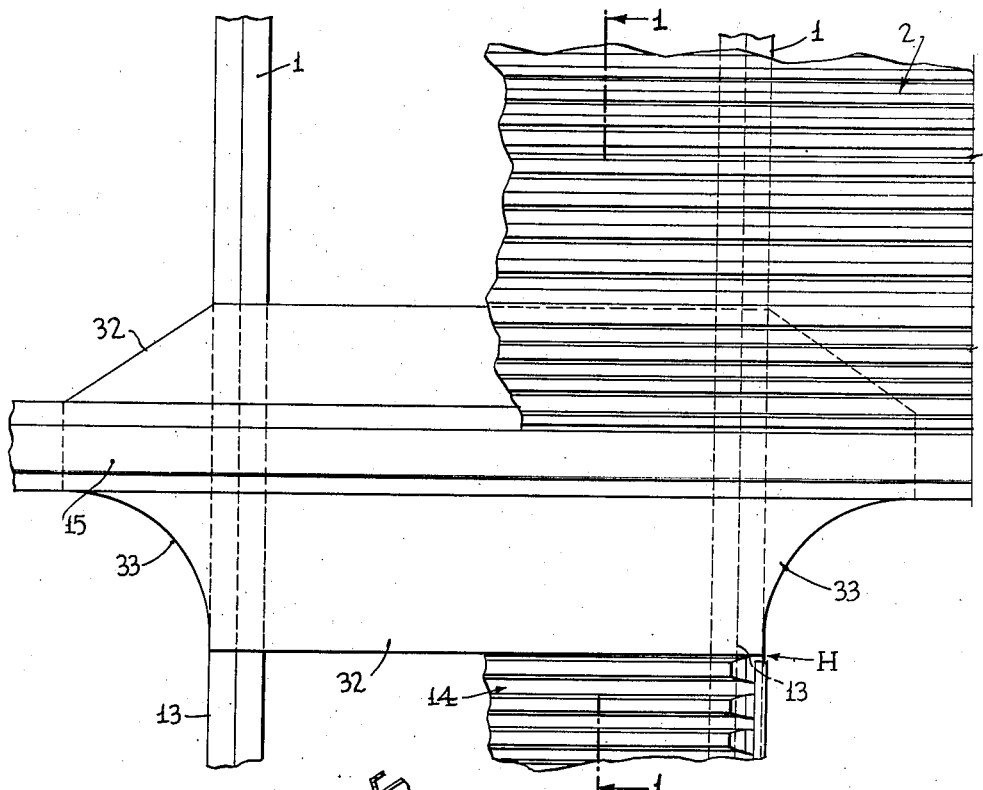
Fig. 2 is an elevation, partially broken away, corresponding to Fig. 1, of the same zone of junction.

In the exemplary construction shown on the accompanying drawing 13 designates two body uprights, preferably of Z-cross section, and serving at the same time as mounting for the window frame, the upper parts of these uprights being connected together by means of a member 30, U-shaped for example, welded to the uprights. One of the panels 14, of corrugated sheet metal, terminating substantially at the level H, is affixed, by welding, to the outer flanges of the uprights 13.

Corresponding to each upright 13, in the roof, is a roof arch 1 (also of Z-section for example), the ends of the different roof arches being interconnected by a U-shaped member 31, welded for example to the roof arches covered by corrugated metal 2 forming the roof, and welded to the outer flange of each roof arch.

The union between the assemblage—roof and each side of the vehicle—is realized by welding the contacting surfaces of the members 30 and 31.

According to the invention this joint can be completed and reinforced, or even replaced, at the point occupied by each of the panels separating the window openings, by a strong outer stay plate 32 welded, on the one hand to the outer flanges of two roof arches 1, to the outer flange of the member 31 and, on the other, covered, to the level of member 31, by the lower part of the roof corrugated metal 2 welded along its corrugations to said stay plate.

When the roof assemblage is mounted on each of the assemblages constituting the sides of the vehicle (connected to the roof, for example, by welding the contacting surfaces of the members 30 and 31) the lower part of the stay plate 32 passes just to the precedingly mentioned level H, so that said lower part can be welded to the outer flange of the member 30 and to the outer flanges of the uprights 13, and that the lower edge of the stay plate can cover (overlap) the upper part of the outer corrugated metal panel 14 and be welded thereto.

At the level of the junction between the members 30 and 31 a molding 15 may be provided above the stay plate and extending over the entire length of the vehicle, said molding being welded, on the one hand, to the different stay plates of a side and, on the other, to the lower edge of the corrugated metal 2 of the roof.

The part of the stay plate below the molding 15, as shown at 33 on Fig. 2, has a form such that said stay plate serves at the same time as a member for delimiting the window openings and a portion of the outer panelling.

Figure 1:
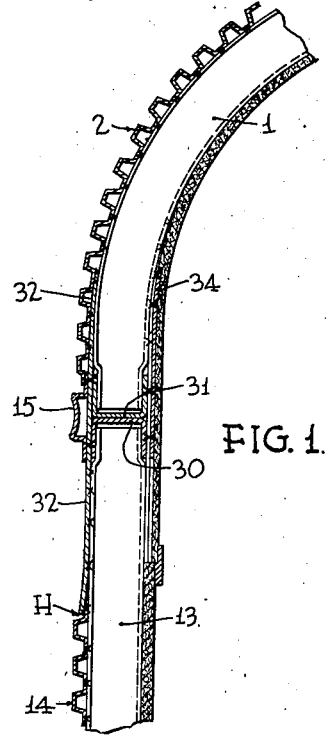
Fig. 1 is a cross section, on line I—I, of Fig. 2, of the junction zone between the roof and a side member at the point of a panel separating two window openings.

According to another feature of the invention, the action of the different stay plates may be completed by that of an inner stay plate 34 extending over the entire length of the vehicle, the inner edge of which passes to the level of the lower edge of the molding 15 and the upper edge substantially to the level of the upper edge of the different stay plates 32, the inner stay plate being secured, see Fig. 1, to the longitudinal members 30 and 31 and to the arches 1. In a modification said inner stay plate may be replaced by a number of inner stay plates corresponding to the outer stay plates and of practically the same dimensions.

The assemblage thus obtained consists of a joint which perfectly withstands shearing stresses between the sides and roof of the vehicle, as well as bending stresses. It is also to be noted that the outer stay plate 32 also forms a reinforcement for the margins of the roof in that, at the point at which it overlaps and is welded with the corrugations of the roof, the longitudinal junction lines between said stay plate and the corrugated sheet metal form sections of closed contour, thus having great rigidity. At the point at which this stay plate is welded to the outer corrugated panel 14 it transmits shearing and other stresses to said panel and, hence, to the side of the vehicle.

The embodiment described herein and illustrated on the drawing is given by way of example only, it being apparent that the connection may undergo any desired modification of detail without departing from the scope of the invention.

What I claim is:

A joint between sheet metal side and roof units of a passenger-type vehicle body in which the side unit has door or window openings spaced by shear panels formed by angular cross section uprights flanking adjacent openings and interconnected by paneling and said uprights connected at their upper ends by an angular cross section longitudinal member, and in which the roof unit has transverse angular cross section arches corresponding in longitudinal location to the side unit uprights and interconnected by paneling and at their ends by an angular cross section longitudinal member arranged to overlap and be secured to the longitudinal member at the top of a side unit in final assembly, the units being additionally interconnected in final assembly in the region longitudinally between door or window openings and some distance therebyond on each side of a door or window opening by a continuous extensive stay plate overlapping the outer faces of the uprights and arches in said region and also the longitudinal members connecting them, and secured thereto and forming outer face paneling throughout a large portion of its extent, and further overlapping and secured throughout the overlaps both to the roof and side wall paneling, the overlap and securement with the roof paneling extending over a substantial area, the ends of the stay plate defining the corner portions of the margins of the adjacent openings.

WALTER B. DEAN.